US012747188B2

(12) United States Patent
Wu et al.

(10) Patent No.: US 12,747,188 B2
(45) Date of Patent: Sep. 29, 2026

(54) METHOD FOR PREPARING HIGH-PERFORMANCE COMPRESSED DESERT SAND CONCRETE

(71) Applicant: Shenzhen University, Shenzhen (CN)

(72) Inventors: Yufei Wu, Shenzhen (CN); Syed Minhaj Saleem Kazmi, Shenzhen (CN); Muhammad Junaid Munir, Shenzhen (CN); Xun Wang, Shenzhen (CN)

(73) Assignees: Jinan University, Shenzhen (CN); Shenzhen University, Shenzhen (CN)

( * ) Notice: Subject to any disclaimer, the term of this patent is extended or adjusted under 35 U.S.C. 154(b) by 62 days.

(21) Appl. No.: 18/882,974

(22) Filed: Sep. 12, 2024

(65) Prior Publication Data

US 2026/0028276 A1 Jan. 29, 2026

(30) Foreign Application Priority Data

Jul. 24, 2024 (CN) ........................ 202411002731.X

(51) Int. Cl.

| | |
|---|---|
| ***C04B 14/06*** | (2006.01) |
| ***B28B 3/02*** | (2006.01) |
| ***C04B 14/48*** | (2006.01) |
| ***C04B 20/02*** | (2006.01) |
| ***C04B 28/04*** | (2006.01) |
| ***C04B 40/00*** | (2006.01) |

(52) U.S. Cl.

CPC .............. *C04B 14/068* (2013.01); *B28B 3/02* (2013.01); *C04B 14/48* (2013.01); *C04B 20/023* (2013.01); *C04B 28/04* (2013.01); *C04B 40/0071* (2013.01); *C04B 2201/52* (2013.01)

(58) Field of Classification Search

CPC . B29C 39/00; B29C 2949/3056; B29C 70/40; B29C 43/184; B29C 2043/147; B29C 43/006; B29C 43/00

See application file for complete search history.

(56) References Cited

FOREIGN PATENT DOCUMENTS

| | | | |
|---|---|---|---|
| CN | 102503201 | * | 4/2013 |
| CN | 107915444 | * | 4/2018 |
| CN | 110498639 | * | 9/2021 |

* cited by examiner

*Primary Examiner* — Stella K Yi

(74) *Attorney, Agent, or Firm* — Fresh IP PLC; Clifford D. Hyra; Aubrey Y. Chen

(57) ABSTRACT

A method for preparing a high-performance compressed desert sand concrete is provided. The method includes: mixing a cement, a coarse aggregate, a fine aggregate, and water, and subjecting a mixture to compression casting, and curing in sequence to obtain the high-performance compressed desert sand concrete; where the compression casting is conducted at a pressure of not less than 2 MPa for not less than 2 min.

7 Claims, 9 Drawing Sheets

METHOD FOR PREPARING HIGH-PERFORMANCE COMPRESSED DESERT SAND CONCRETE

CROSS REFERENCE TO RELATED APPLICATION

This patent application claims the benefit and priority of Chinese Patent Application No. 202411002731X filed with the China National Intellectual Property Administration on Jul. 24, 2024, the disclosure of which is incorporated by reference herein in its entirety as part of the present application.

TECHNICAL FIELD

The present disclosure belongs to the technical field of building materials, and in particular relates to a method for preparing a high-performance compressed desert sand concrete.

BACKGROUND

Concrete is one of the most widely used building materials in the engineering industry due to its easy availability of raw materials, excellent performance, and economy. Production of the concrete requires a large amount of sand and gravel aggregates, while many countries are facing the shortage of natural resources such as sand and gravel. In recent years, with the intensification of desertification problems, people have begun to pay attention to the resource utilization of desert sand, and try to solve the scarcity of natural river sand while achieving the control of desertification.

However, compared with the natural river sand, the desert sand exhibits extremely different properties. The natural river sand usually has uniform particle size distribution, desirable gradation, and excellent quality, while the desert sand shows poor gradation, round and smooth particles in a large amount, high fineness, and relatively weak physical and mechanical properties.

Researchers prepare desert sand concrete through a direct substitution method, that is, directly adding the desert sand to replace the natural river sand as a fine aggregate of the concrete during the preparation of concrete. However, due to the poor gradation, round and smooth particles, and high fineness of the desert sand, poor durability and mechanical properties of the desert sand concrete are obtained, resulting in a low replacement rate of the desert sand in concrete.

SUMMARY

An object of the present disclosure is to provide a method for preparing a high-performance compressed desert sand concrete. In the present disclosure, the method allows 100% replacement with desert sand without reduction in the mechanical and durability performance of concrete.

To achieve the above object, the present disclosure provides the following technical solutions.

The present disclosure provides a method for preparing a high-performance compressed desert sand concrete, including the following steps: mixing a cement, a coarse aggregate, a fine aggregate, and water, and subjecting a resulting fresh concrete mixture to compression casting, and curing in sequence to obtain the high-performance compressed desert sand concrete; where the compression casting includes filling of a steel mold with the resulting fresh concrete mixture while compression; the fine aggregate includes river sand and desert sand at a mass ratio of 0-99:1-100; and the compression casting is conducted at a pressure of not less than 2 MPa for not less than 2 min.

In some embodiments, a mass ratio of the water to the cement is in a range of 0.1-0.7:1.

In some embodiments, a mass ratio of the cement to the coarse aggregate is in a range of 1:0.5-10.

In some embodiments, the desert sand is subjected to chemical treatment before use; and the chemical treatment includes one or more selected from the group consisting of acid leaching, alkali leaching, and heat treatment.

In some embodiments, an acid for the acid leaching includes one or more selected from the group consisting of hydrochloric acid and sulfuric acid.

In some embodiments, raw materials for the mixing further include one or more selected from the group consisting of a metal mesh and a fiber; and the fiber includes one or more selected from the group consisting of a steel fiber and a synthetic fiber.

In some embodiments, a total volume of the metal mesh and the fiber accounts for not more than 2% of the high-performance compressed desert sand concrete.

In some embodiments, the compression is conducted for 24 h.

In some embodiments, the curing is conducted at a temperature of 18° C. to 30° C. under a relative humidity of not less than 60% for 14 days to 28 days.

In some embodiments, the high-performance compressed desert sand concrete is used to manufacture desert sand brick, a desert sand block, a desert sand prefabricated pipe, a desert sand prefabricated building beam, a desert sand prefabricated building wall, and a desert sand prefabricated building panel.

The present disclosure provides a method for preparing a high-performance compressed desert sand concrete. The method adopts desert sand to replace natural river sand as the fine aggregate, and could effectively reduce mechanical properties and durability defects of concrete caused by directly using the desert sand to replace the natural river sand through compression casting. The method also allows 100% replacement of the natural river sand with the desert sand while ensuring excellent mechanical properties and durability of the desert sand concrete (compared to direct replacement with the desert sand). The high-performance compressed desert sand concrete has improved mechanical properties and durability as well as desirable comprehensive performances.

The results of the Examples show that the compressive strength, elastic modulus, and splitting tensile strength of the high-performance compressed desert sand concretes disclosed in the present disclosure are increased by 125%, 82%, and 70%, respectively, compared with the river sand concrete and desert sand concrete of Comparative Examples. The increase is particularly obvious as the desert sand content increases. Compared with the natural river sand concrete of Comparative Example, water absorptions of the high-performance compressed desert sand concretes of the present disclosure are reduced by 41%, 38%, and 27%, respectively. As the desert sand content increases, carbonation resistance and chloride ion penetration resistance of the concrete of Comparative Examples also decrease. However, compression casting significantly improves the carbonation resistance and chloride ion penetration resistance of the high-performance compressed desert sand concrete, increasing the carbonation resistance of the high-performance compressed desert sand concrete by 100% and the chloride ion penetration resistance by 64%.

In the present disclosure, the method is expected to bring significant benefits, such that the high-performance compressed desert sand concrete could be applied to actual engineering structures to manufacture desert sand bricks, desert sand blocks, desert sand prefabricated pipes, desert sand prefabricated building beams, desert sand prefabricated building walls, or desert sand prefabricated building panels. The method also promotes environmental sustainable development and the innovation and application of green high-performance building materials, thereby solving the problem of scarcity of natural river sand resources and contributing to desertification control and global sustainable development.

BRIEF DESCRIPTION OF THE DRAWINGS

To describe the technical solutions in embodiments of the present disclosure or in the prior art more clearly, the drawings required for the embodiments are briefly described below. Apparently, the drawings in the following description show merely some embodiments of the present disclosure, and those of ordinary skill in the art may still derive other drawings from these drawings without creative efforts.

DETAILED DESCRIPTION OF THE EMBODIMENTS

Figure 1:
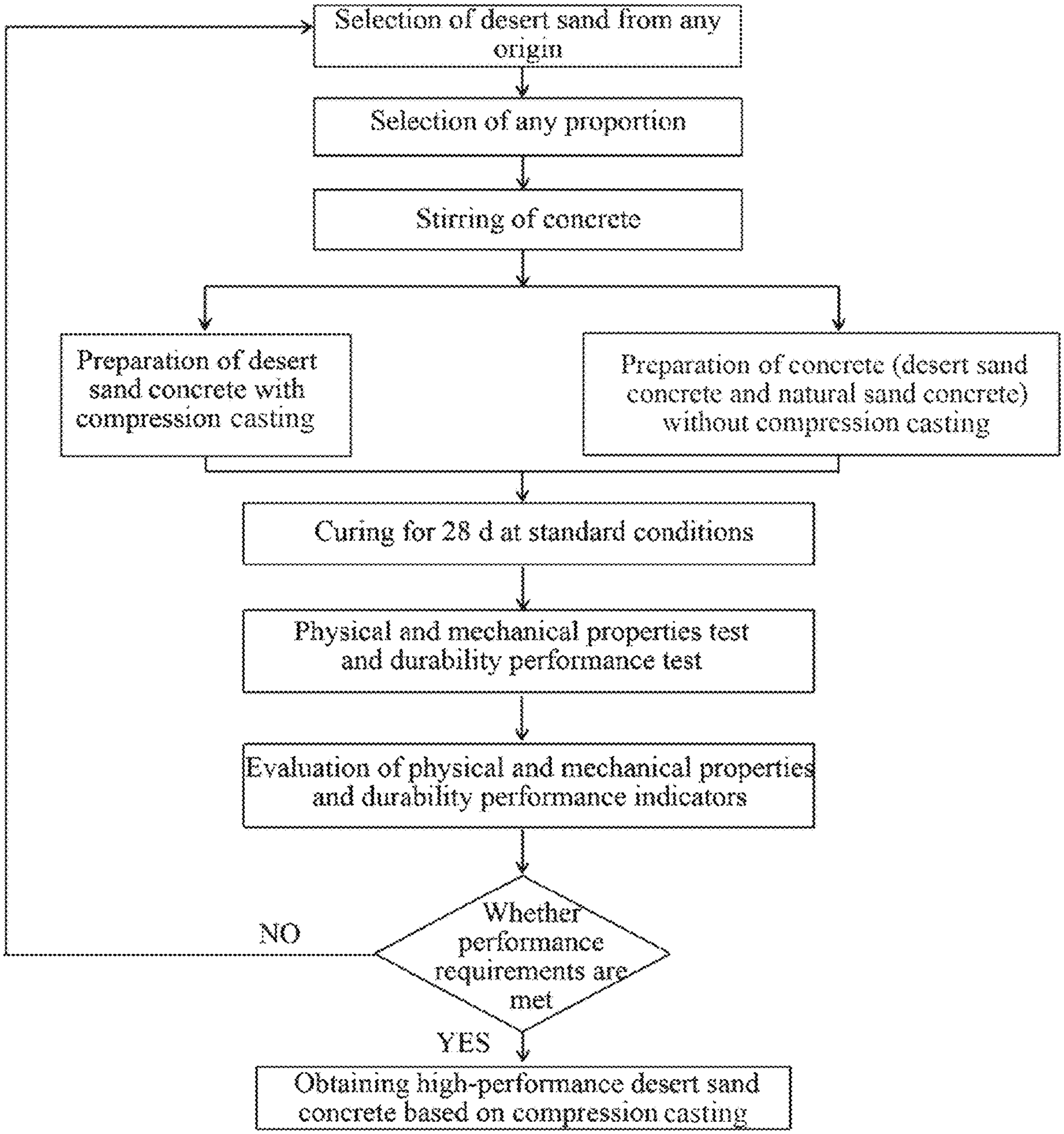
FIG. 1 shows a process flow chart of the method for preparing a high-performance compressed desert sand concrete according to an embodiment of the present disclosure.

The present disclosure provides a method for preparing a high-performance compressed desert sand concrete, including the following steps: mixing a cement, a coarse aggregate, a fine aggregate, and water, and subjecting a resulting fresh concrete mixture to compression casting, and curing in sequence to obtain the high-performance compressed desert sand concrete; where the compression casting includes filling of a steel mold with the resulting fresh concrete mixture while compression; the fine aggregate includes river sand and desert sand at a mass ratio of 0-99:1-100; and the compression casting is conducted at a pressure of not less than 2 MPa for not less than 2 min.

In the present disclosure, a cement, a coarse aggregate, a fine aggregate, and water are mixed. There are no special requirements on dosages of the cement, coarse aggregate, fine aggregate, and water.

In some embodiments of the present disclosure, the cement is a Portland cement, and preferably a P.O42.5 Portland cement.

In some embodiments of the present disclosure, a mass ratio of the water to the cement is in a range of 0.1-0.7:1, preferably 0.3-0.6:1, and more preferably 0.4-0.5:1.

In some embodiments of the present disclosure, the coarse aggregate is determined according to the standard "Pebble and crushed stone for construction", GB/T 14685: 2011.

In some embodiments of the present disclosure, the coarse aggregate is subjected to drying before use; and the drying is performed by oven drying.

In some embodiments of the present disclosure, a mass ratio of the cement to the coarse aggregate is in a range of 1:0.5-10, preferably 1:1-7, and more preferably 1:4-5.

In some embodiments of the present disclosure, river sand of the fine aggregate is determined according to the standard "Sand for construction", GB/T 14684: 2011, and preferably natural river sand.

In some embodiments of the present disclosure, the fine aggregate is subjected to drying before use; and the drying is performed by oven drying.

In some embodiments of the present disclosure, gradations of the coarse aggregate and the fine aggregate are determined according to the standard of ASTM C33: 2016.

In the present disclosure, there is no requirement for an origin of desert sand. In a specific embodiment of the present disclosure, the desert sand is collected from the Kubuqi Desert in the northwest of Inner Mongolia Autonomous Region, China; the desert sand is subjected to chemical treatment before use; and the chemical treatment includes one or more selected from the group consisting of acid leaching, alkali leaching, and heat treatment.

In some embodiments of the present disclosure, an acid for the acid leaching includes one or more of hydrochloric acid and sulfuric acid; an alkali for the alkali leaching includes one or more of metal hydroxide, carbonate, and bicarbonate; the metal hydroxide includes one or more of sodium hydroxide and potassium hydroxide; the carbonate is sodium carbonate; and the bicarbonate is sodium bicarbonate. In some embodiments of the present disclosure, the heat treatment is performed by: washing the desert sand with water and then conducting oven drying. In some embodiments of the present disclosure, the oven drying is conducted at 110° C. for 24 h. In the present disclosure, impurities are removed by the chemical treatment.

In some embodiments of the present disclosure, the desert sand is subjected to drying before use (when the chemical treatment is conducted, the chemical treatment and the drying are conducted in sequence); and the drying is oven drying.

In some embodiments of the present disclosure, a mass ratio of the river sand to the desert sand of 0-90:10-100, preferably 0-60:40-100, and more preferably 0:100. The method provided by the present disclosure can use 1% to 100% of the desert sand to replace the fine aggregates such as the natural river sand, and improve the mechanical properties and durability of a high-performance compressed desert sand concrete.

In some embodiments of the present disclosure, raw materials for the mixing further include one or more selected from the group consisting of a metal mesh and a fiber; the metal mesh is a steel mesh; and the fiber includes one or more selected from the group consisting of a steel fiber and a synthetic fiber.

In some embodiments of the present disclosure, a total volume of the metal mesh and the fiber accounts for not more than 2%, and preferably 1% to 2% of the high-performance compressed desert sand concrete. The performance improvement effect of the method on a fiber concrete is similar to that of the desert sand concrete. The degree of improvement of mechanical properties such as strength is different depending on the fiber type and dosage.

In some embodiments of the present disclosure, the raw materials for the mixing further include a water reducer; the water reducer is a modified polycarboxylate water reducer; and a mass ratio of the water reducer to the cement is in a range of 0.5-3:100, and preferably 1-2:100.

In some embodiments of the present disclosure, the mixing is conducted by stirring; and the stirring is conducted according to the standard of ASTM C192: 2016.

In some embodiments of the present disclosure, after the mixing is completed, a resulting fresh concrete mixture is subjected to compression casting, and curing in sequence to obtain the high-performance compressed desert sand concrete. In some embodiments of the present disclosure, a mold of the compression casting is a steel mold; and the steel mold is selected from the group consisting of a cylindrical mold, a cubic mold, a rectangular mold, and a special-shaped mold.

In some embodiments of the present disclosure, the compression casting is conducted at a pressure of not less than 2 MPa, preferably 2 MPa to 30 MPa, more preferably 10 MPa to 25 MPa, and even more preferably 15 MPa to 20 MPa. In some embodiments of the present disclosure, the compression casting is conducted for not less than 2 min, and preferably 2 min to 1,440 min.

In some embodiments of the present disclosure, the compression is conducted for 24 h.

In some embodiments of the present disclosure, after the compression casting is completed, the mold is removed.

In some embodiments of the present disclosure, the curing is conducted at a temperature of 18° C. to 30° C., and preferably 20° C. to 24° C. In some embodiments of the present disclosure, the curing is conducted under a relative humidity of not less than 60%, preferably 80% to 100%, and more preferably 95% to 100%. In some embodiments of the present disclosure, the curing is conducted for 14 days to 28 days, and preferably 21 days to 28 days. In some embodiments of the present disclosure, the curing is conducted in a standard curing room.

FIG. 1 shows a process flow chart of the method for preparing a high-performance compressed desert sand concrete according to an embodiment of the present disclosure. In the present disclosure, the method for preparing the high-performance compressed desert sand concrete includes the following steps: mixing a cement, a coarse aggregate, a fine aggregate, and water, and subjecting a resulting fresh concrete mixture to compression casting (the present disclosure) or no compression casting (Comparative Example), and then curing to obtain the high-performance compressed desert sand concrete. The high-performance compressed desert sand concrete is further subjected to performance testing. The method is suitable for manufacturing desert sand cement mortar materials and structures by the compression casting, such as desert sand bricks, blocks, prefabricated pipes, prefabricated building beams, prefabricated building walls, and prefabricated building panels.

In order to further illustrate the present disclosure, the technical solutions provided by the present disclosure are described in detail below with reference to drawings and examples, but these drawings and examples should not be understood as limiting the scope of the present disclosure.

EXAMPLE

In this example, desert sand was collected from Kubuqi Desert in the northwest of Inner Mongolia Autonomous Region, China. A coarse aggregate (stone) and natural river sand were collected from Shenzhen, China. A cement was ordinary Portland cement (P.O42.5), water was tap water, and an admixture was a high-efficiency water reducer (modified polycarboxylate water reducer).

Figure 2A:
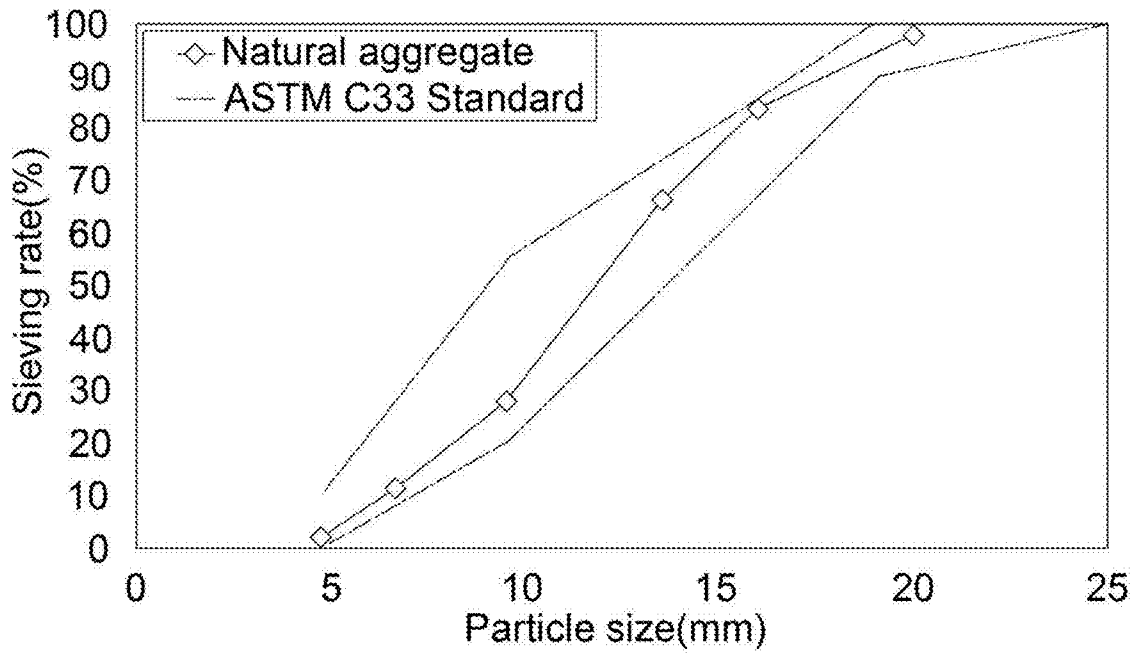
FIG. 2A shows a gradation curve of the coarse aggregates in Examples 1 to 9 and Comparative Examples 1 to 9.
Figure 2B:
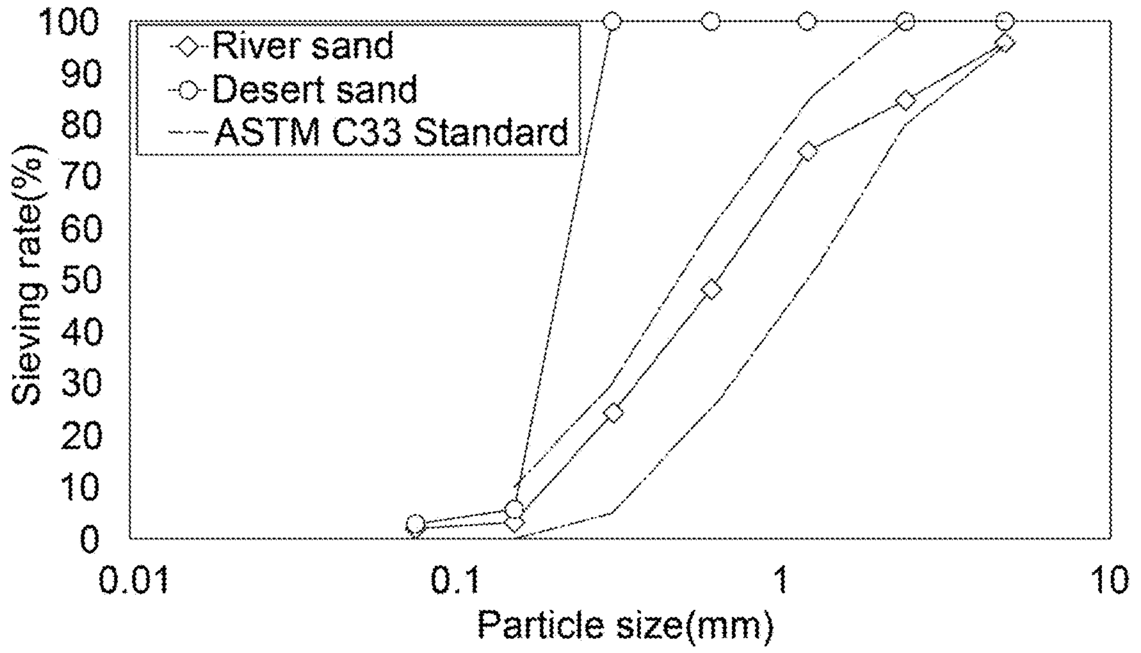
FIG. 2B shows gradation curves of the fine aggregates in Examples 1 to 9 and Comparative Examples 1 to 9.

Gradations of the coarse aggregate and a fine aggregate are shown in FIGS. 2A-2B, and physical and mechanical properties of the coarse aggregate and the fine aggregate are shown in Tables 1 and 2. Water-to-cement ratios used were 0.7 and 0.3. The natural river sand was replaced by the desert sand (by weight), and replacement rates were 0%, 50%, and 100%, respectively.

TABLE 1

Physical and mechanical properties of the coarse aggregate

| Performance indexes | Coarse aggregate |
|---|---|
| Bulk density (kg/m$^3$) | 1609 |
| Water absorption (%) | 0.83 |
| Saturated-surface-dry specific gravity | 2.58 |
| Drying specific gravity | 2.56 |
| Apparent specific gravity | 2.61 |

TABLE 2

Physical and mechanical properties of the fine aggregate

| Performance indexes | River sand | Desert sand |
|---|---|---|
| Bulk density (kg/m$^3$) | 1729 | 1582 |
| Water absorption (%) | 2.90 | 1.83 |
| Fineness modulus | 2.69 | 0.94 |

Figure 3:
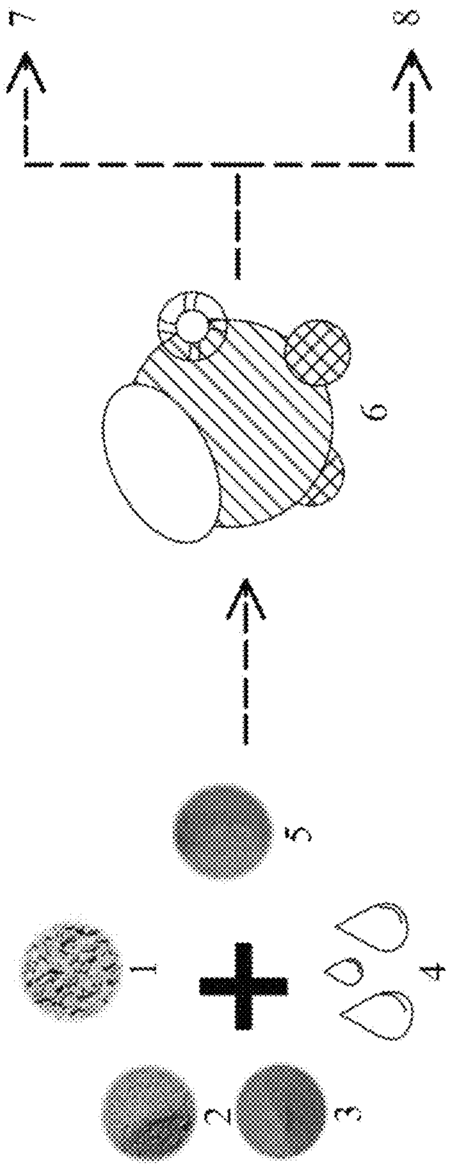
FIG. 3 shows process flow charts of the preparation of the high-performance compressed desert sand concretes in the Examples and the preparation of the concretes in the Comparative Examples, in which 1 refers to a coarse aggregate (stone), 2 refers to natural river sand, 3 refers to desert sand, 4 refers to water, 5 refers to a cement, 6 refers to stirring of concrete, 7 refers to preparation of concrete (desert sand concrete and natural sand concrete) without compression casting, and 8 refers to preparation of desert sand concrete with compression casting under compression pressure of 15 MPa and compression time of 2 min.
Figure 4A:
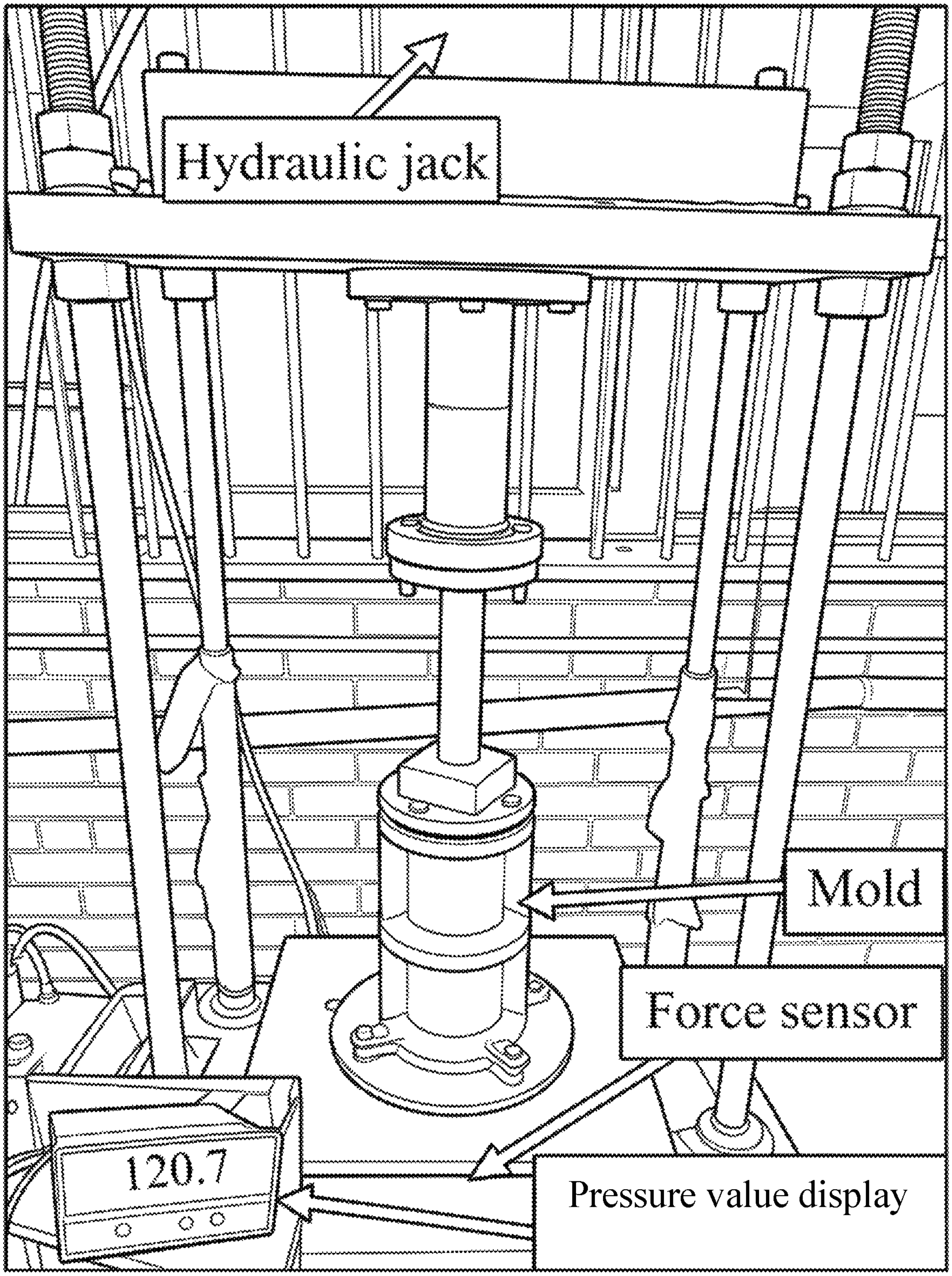
FIG. 4A shows a preparation device used in Examples 1 to 9 and Comparative Examples 1 to 9, in which 9 refers to a hydraulic jack, 10 refers to a mold, 11 refers to a force sensor, and 12 refers to a pressure value display.
Figure 4B:
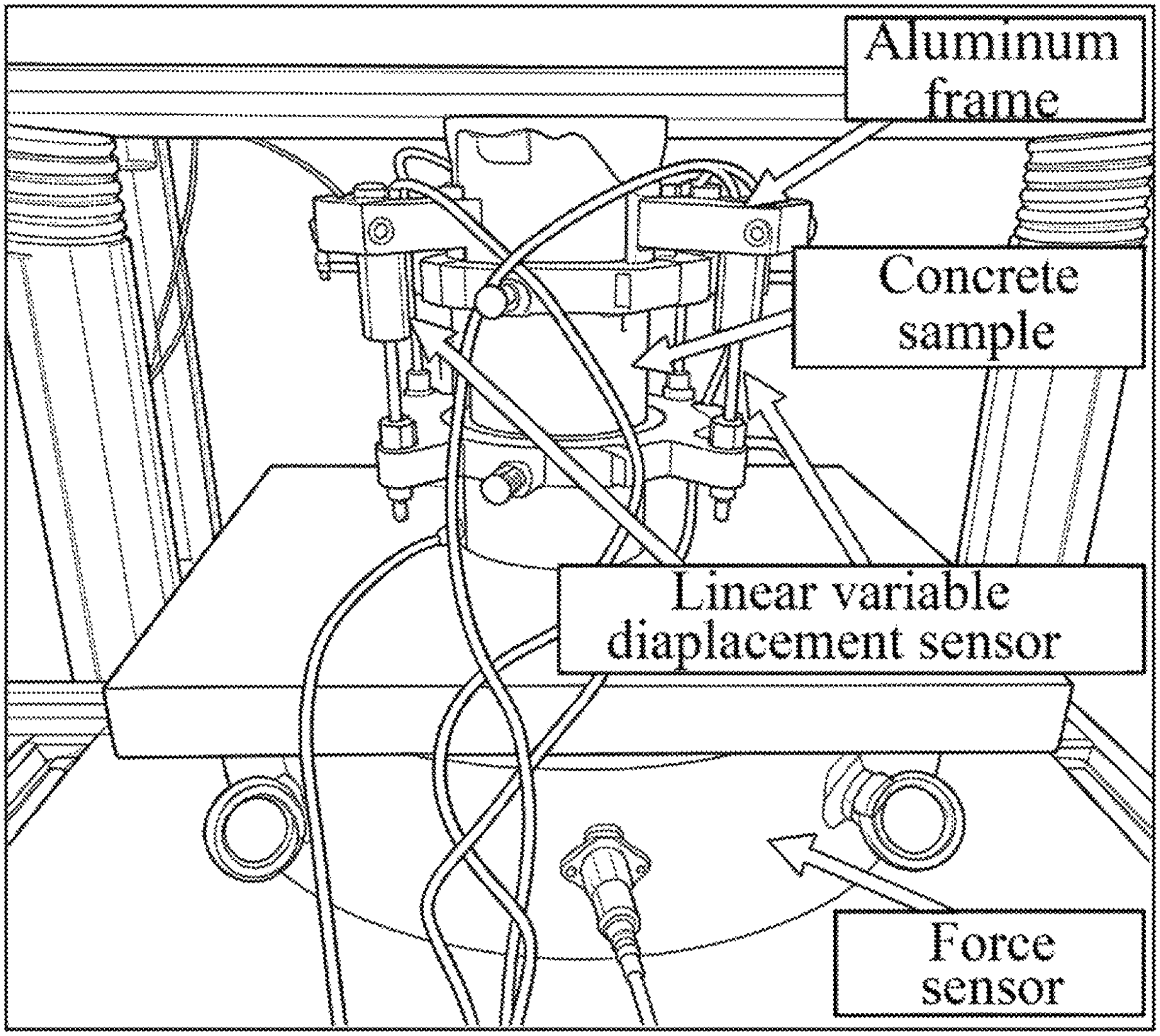
FIG. 4B shows a test device used in Examples 1 to 9 and Comparative Examples 1 to 9, in which 13 refers to an aluminum frame, 14 refers to a concrete sample, 15 refers to a linear variable displacement sensor, and 16 refers to a force sensor.

All aggregates were subjected to drying for 24 h before stirring, and then subjected to stirring using a double-shaft mixer in accordance with standard of ASTM C192: 2016. After the stirring, the high-performance compressed desert sand concrete of the present disclosure and an ordinary desert sand concrete (without compression casting) were prepared, where process flow charts of the preparation are shown in FIG. 3, and a preparation device and a test device are shown in FIGS. 4A-4B.

The specifications and proportions of the prepared concrete are shown in Table 3. The size is 100 mm×200 mm (diameter×height), and the design strength grades are C30, C50, and C70 (i.e., 30 MPa, 50 MPa, and 70 MPa), respectively. The concrete name indicates the target strength, desert sand replacement rate, and with or without compression casting. For example, C50-D50-P means a concrete with a target strength of 50 MPa, and 50% of the natural river sand replaced by the desert sand, with the compression casting. C50 means an ordinary natural sand concrete with a desert sand replacement rate of 0% (without compression casting).

TABLE 3

Specifications and proportions of concretes prepared in Examples 1 to 9 and Comparative Examples 1 to 9

| Example | Proportion | Target strength (MPa) | Cement (kg/m$^3$) | Coarse aggregate (kg/m$^3$) | Natural river sand (kg/m$^3$) | Desert sand (kg/m$^3$) | Water-cement ratio | Admixture (kg/m$^3$) |
|---|---|---|---|---|---|---|---|---|
| Example 1 | C30-P | 30 | 277 | 922 | 565 | — | 0.7 | — |
| Example 2 | C30-D50-P | | | | 283 | 283 | | |
| Example 3 | C30-D100-P | | | | — | 565 | | |
| Example 4 | C50-P | 50 | 375 | 802 | 644 | — | 0.3 | 1.88 |
| Example 5 | C50-D50-P | | | | 322 | 322 | | |
| Example 6 | C50-D100-P | | | | — | 644 | | |
| Example 7 | C70-P | 70 | 510 | 785 | 469 | — | 0.3 | 2.55 |
| Example 8 | C70-D50-P | | | | 235 | 235 | | |
| Example 9 | C70-D100-P | | | | — | 469 | | |
| Comparative Example 1 | C30 | 30 | 277 | 922 | 565 | — | 0.7 | — |
| Comparative Example 2 | C30-D50 | | | | 283 | 283 | | |
| Comparative Example 3 | C30-D100 | | | | — | 565 | | |
| Comparative Example 4 | C50 | 50 | 375 | 802 | 644 | — | 0.3 | 1.88 |
| Comparative Example 5 | C50-D50 | | | | 322 | 322 | | |
| Comparative Example 6 | C50-D100 | | | | — | 644 | | |
| Comparative Example 7 | C70 | 70 | 510 | 785 | 469 | — | 0.3 | 2.55 |
| Comparative Example 8 | C70-D50 | | | | 235 | 235 | | |
| Comparative Example 9 | C70-D100 | | | | — | 469 | | |

A method for preparing the desert sand concrete in this example was performed as follows:

P.O42.5 silicate cement, the coarse aggregate, the fine aggregate (the river sand and the desert sand), and water were mixed, and a resulting fresh concrete mixture was then subjected to compression casting in a steel mold (at 2 MPa for not less than 2 min). The steel mold was placed at room temperature for 24 hours. After 24 hours, the mold was removed, and a resulting product was then cured for 14 days to 28 days in a standard curing room at a temperature of 18° C. to 30° C. under a relative humidity of not less than 60% to obtain the desert sand concrete.

Test Example 1

Figure 5:
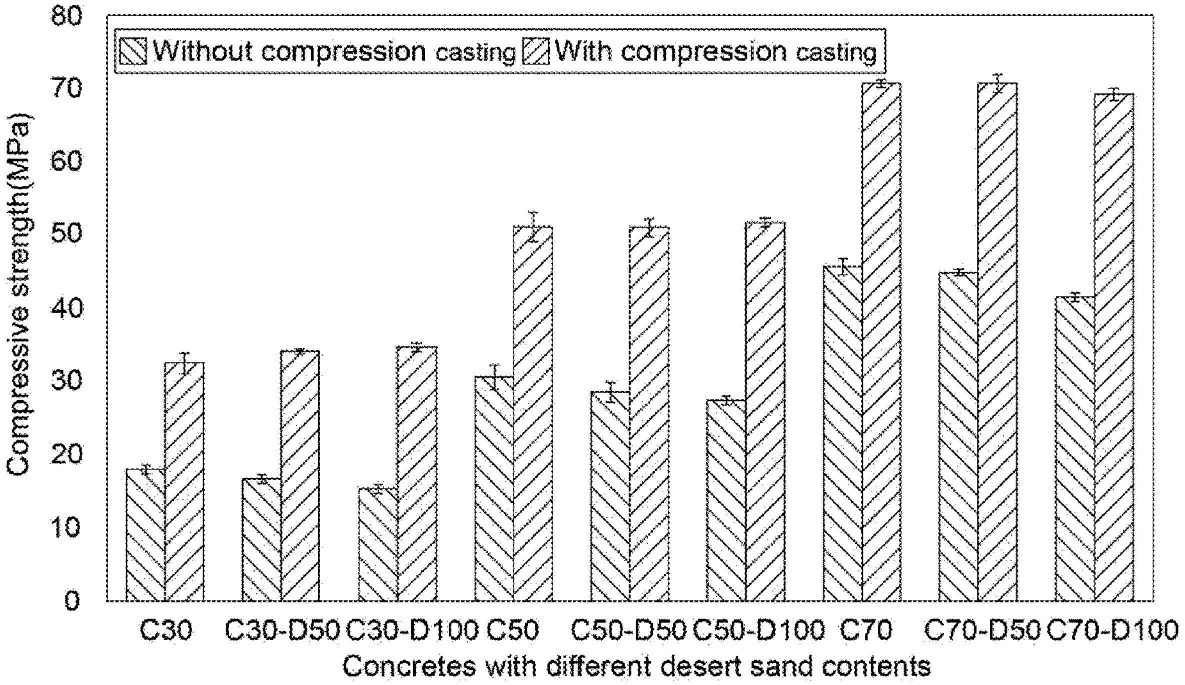
FIG. 5 shows compressive strengths of the concretes in Examples 1 to 9 and Comparative Examples 1 to 9.

The concretes prepared in Examples 1 to 9 and Comparative Examples 1 to 9 were tested for compressive strength in accordance with ASTM C39: 2021, and the results are shown in FIG. 5. According to FIG. 5, compared with the concrete of Comparative Example C30, the compressive strengths of the concretes of the Comparative Examples C30-D50 and C30-D100 decrease by 7% and 14%, respectively. Similarly, compared with the concrete of the Comparative Examples C50 and C70, the compressive strengths of the concretes of the Comparative Examples C50-D50 and C50-D100, C70-D50 and C70-D100 decrease by 7% and 10%, 2% and 9%, respectively. The compressive strength of the concrete of Comparative Example with the low-strength proportion (i.e., C30) decreases more than that of the relatively high-strength proportion (i.e., C50 and C70). Compared with the concretes of Comparative Examples C30, C50, and C70, the compressive strengths of the concretes of Comparative Examples C30-D100, C50-D100, and C70-D100 decrease by 14%, 10%, and 9%, respectively. It is seen that the compressive strength of the concrete in all comparative proportions decreases with the increase of desert sand content.

In concretes of Examples, different effects of desert sand content could be observed for each concrete proportion (i.e., C30, C50, and C70): compared with the concrete of Example C30, the compressive strengths of the concretes of Examples C30-D50 and C30-D100 increase by 5% and 7%, respectively, which are attributed to the combined effects of the desert sand and the compression casting to improve the pore structure of the concrete.

Compared with the concretes of Comparative Examples C30, C30-D50, and C30-D100, the compressive strengths of the concretes of the Examples C30, C30-D50, and C30-D100 increase by 81%, 105%, and 125%, respectively. Similarly, compared with the concretes of Comparative Examples C50, C50-D50, and C50-D100, the compressive strengths of the concretes of the Examples C50, C50-D50, and C50-D100 increase by 67%, 79%, and 88%, respectively. Compared with the concretes of Comparative Examples C70, C70-D50, and C70-D100, the compressive strengths of the concretes of the Examples C70, C70-D50, and C70-D100 also increase by 55%, 58%, and 67%, respectively. It is seen that the method provided by the present disclosure could significantly improve the compressive strength of the desert sand concrete through the compression casting.

Test Example 2

Figure 6:
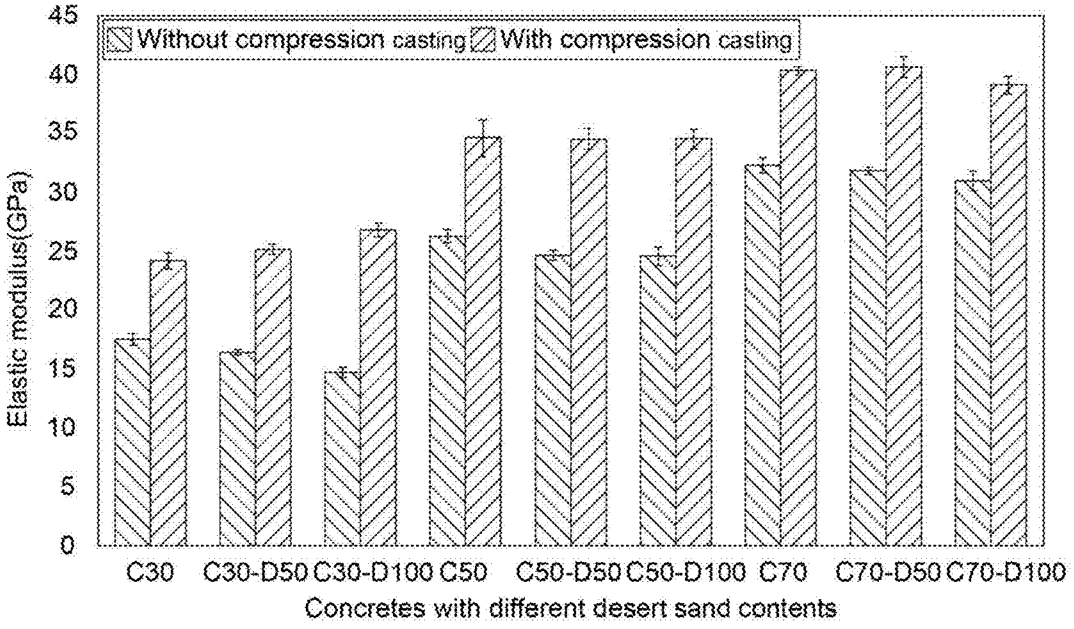
FIG. 6 shows elastic modulus of the concretes in Examples 1 to 9 and Comparative Examples 1 to 9.

The concretes prepared in Examples 1 to 9 and Comparative Examples 1 to 9 were tested for elastic modulus in accordance with ASTM C469: 2014, and the results are shown in FIG. 6. As shown in FIG. 6, for Comparative Examples, as the desert sand content increases, the elastic moduli of all concretes of Comparative Examples will decrease: compared with the concrete of Comparative Example C30, the elastic moduli of the concretes of Comparative Examples C30-D50 and C30-D100 decrease by 6% and 16%, respectively. Similarly, compared with the concrete of Comparative Example C50, the concretes of Comparative Examples C50-D50 and C50-D100 decrease by 6%. Compared with the concrete of Comparative Example C70, the concretes of Comparative Examples C70-D50 and C70-D100 decrease by 1% and 4%, respectively.

The elastic modulus of the concrete of Comparative Example with the low-strength proportion (i.e., C30) decreases more than that of the relatively higher-strength proportions (i.e., C50 and C70). Compared with the concretes of Comparative Examples C30, C50, and C70, the elastic moduli of the concretes of Comparative Examples C30-D100, C50-D100, and C70-D100 decrease by 16%, 6%, and 4%, respectively.

Compared with the concrete of Example C30, the elastic moduli of the concretes of Examples C30-D50 and C30-D100 increase by 4% and 11%, respectively, which are attributed to the combined effects of the desert sand and compression casting to improve the pore structure of the concrete. Compared with the concrete of Example C50, there is no significant difference in the elastic moduli of the concretes of Example C50-D50 and C50-D100. Similarly, the elastic modulus of the concrete of Example C70-D50 is similar to that of the concrete of Example C70. However, the elastic modulus of the concrete of Example C70-D100 is slightly reduced by 3% compared to the concrete of Example C70.

Compared with the concretes of Comparative Examples C30, C30-D50, and C30-D100 concretes, the elastic moduli of the concretes of Examples C30, C30-D50, and C30-D100 increase by 38%, 54%, and 82%, respectively. Similarly, compared with the concretes of Comparative Examples C50, C50-D50, and C50-D100, the elastic moduli of the concretes of the Examples C50, C50-D50, and C50-D100 increase by 32%, 40%, and 40%, respectively. Compared with the concretes of Comparative Examples C70, C70-D50, and C70-D100, the elastic moduli of the concretes of Examples C70, C70-D50, and C70-D100 also increase by 25%, 28%, and 26%, respectively. It is seen that the method provided by the present disclosure could significantly improve the elastic modulus of the desert sand concrete through the compression casting.

Test Example 3

Figure 7:
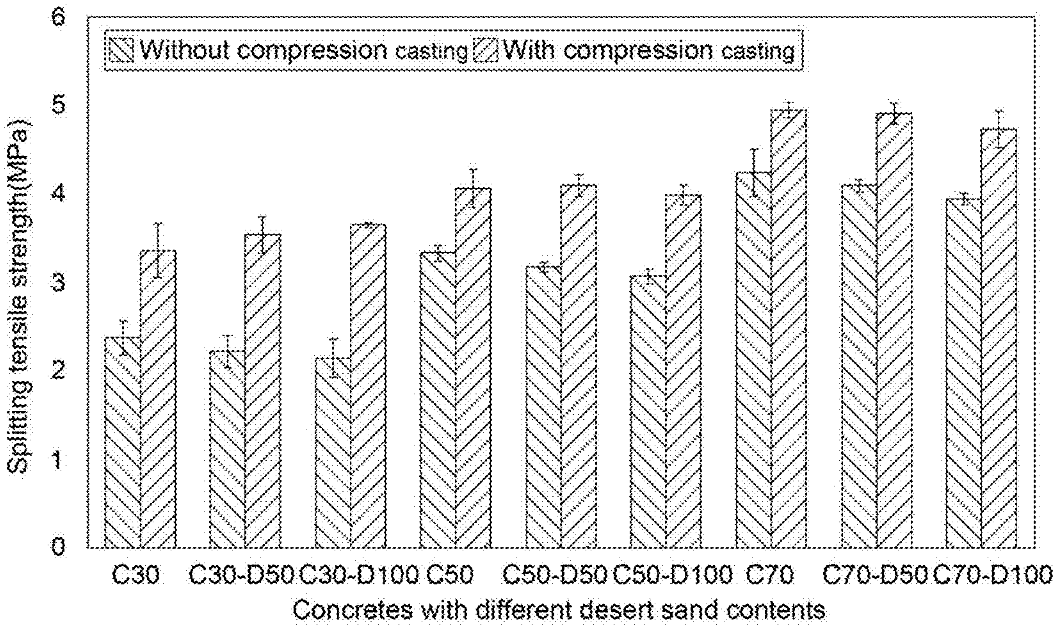
FIG. 7 shows splitting tensile strengths of the concretes in Examples 1 to 9 and Comparative Examples 1 to 9.

The concretes prepared in Examples 1 to 9 and Comparative Examples 1 to 9 were tested for splitting tensile strength in accordance with ASTM C496: 2017, and the results are shown in FIG. 7. As shown in FIG. 7, for Comparative Examples, as the desert sand content increases, the splitting tensile strength of all concretes of Comparative Examples will decrease: compared with the concrete of Comparative Example C30, the splitting tensile strengths of the concretes of Comparative Examples C30-D50 and C30-D100 decrease by 6% and 10%, respectively. Similarly, compared with the concrete of Comparative Example C50, the concretes of Comparative Examples C50-D50 and C50-D100 decrease by 5% and 8%. Compared with the concretes of Comparative Example C70, the concretes of Comparative Examples C70-D50 and C70-D100 decrease by 3% and 7%, respectively.

The splitting tensile strength of the concrete of Comparative Example with the low-strength proportion (i.e., C30) decreases more than that of the relatively higher-strength proportions (i.e., C50 and C70). Compared with the concretes of Comparative Examples C30, C50, and C70, the splitting tensile strengths of the concretes of C30-D100, C50-D100, and C70-D100 concretes decrease by 10%, 8%, and 7%, respectively.

Compared with the concrete of Example C30, the splitting tensile strengths of the concretes of Example C30-D50 and C30-D100 increase by 5% and 9%, respectively. Compared with the concrete of Example C50, there is no significant difference in the splitting tensile strengths of the concretes of Example C50-D50 and C50-D100. Similarly, the splitting tensile strength of the concrete of Example C70-D50 is similar to that of the concrete of Example C70. However, the splitting tensile strength of the concrete of Example C70-D100 is slightly reduced by 4% compared to the concrete of Example C70.

Compared with the concretes of Comparative Examples C30, C30-D50, and C30-D100, the splitting tensile strengths of the concretes of Examples C30, C30-D50, and C30-D100 increase by 42%, 59%, and 70%, respectively. Similarly, compared with the concretes of Comparative Examples C50, C50-D50, and C50-D100 concretes, the splitting tensile strengths of the concretes of Examples C50, C50-D50, and C50-D100 increase by 22%, 29%, and 30% after the compression casting, respectively. Compared with the concretes of Comparative Examples C70, C70-D50, and C70-D100, the splitting tensile strengths of the concretes of Examples C70, C70-D50, and C70-D100 also increase by 17%, 20%, and 20%, respectively. It is seen that the method provided by the present disclosure could significantly improve the splitting tensile strength of the desert sand concrete through the compression casting.

Test Example 4

The water absorption of concrete is crucial, as it determines whether harmful ions could penetrate into the concrete, leading to durability problems and reduced mechanical properties.

Figure 8:
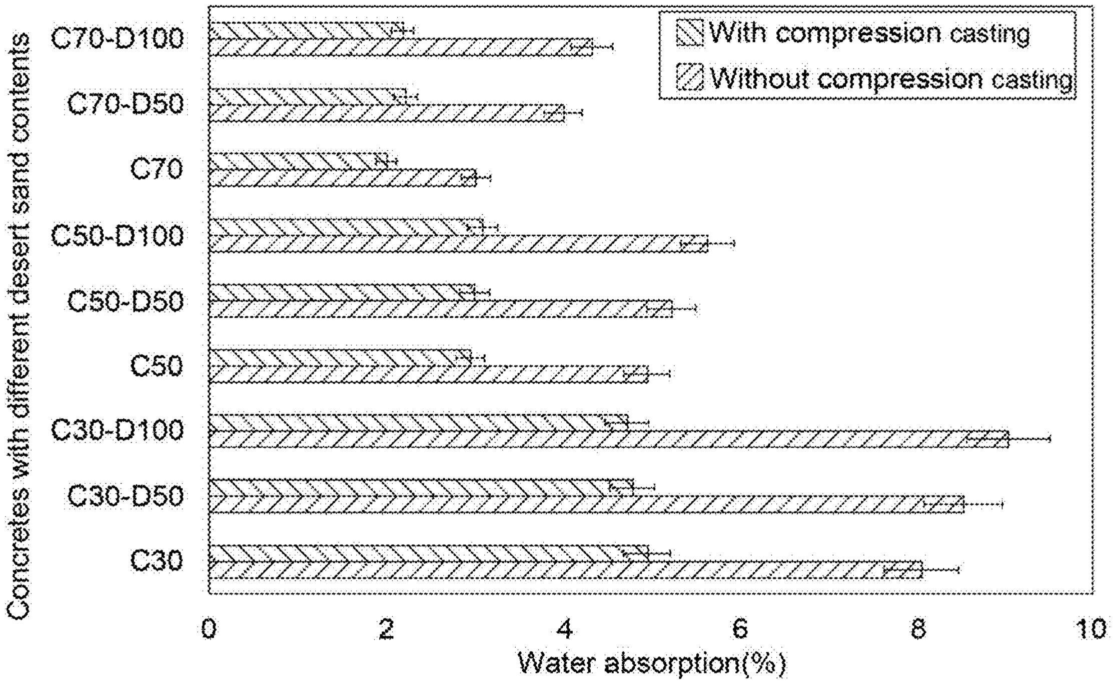
FIG. 8 shows water absorptions of the concretes in Examples 1 to 9 and Comparative Examples 1 to 9.

The concretes prepared in Examples 1 to 9 and Comparative Examples 1 to 9 were tested for water absorption in accordance with ASTM C642: 2013, and the results are shown in FIG. 8.

As shown in FIG. 8, as the desert sand content increases, the water absorption of the concrete also increases: compared with the concretes of Comparative Examples C30, C50, and C70, the water absorptions of the concretes of Comparative Examples C30-D100, C50-D100, and C70-D100 after immersion in water are 9%, 6%, and 4%, respectively. The reason for the increase in the water absorptions of the concretes of Comparative Examples after adding desert sand might be that the poor gradation of desert sand leads to pores in the desert sand concrete, which in turn leads to an increase in water absorption.

Compared with the concretes of Comparative Examples, the water absorptions of all the concretes of Examples decrease significantly: compared with the concretes of Comparative Examples C30, C50, and C70, the water absorptions of the concretes of Examples C30, C50, and C70 decrease from 8%, 5%, and 3% to 5%, 3%, and 2%, respectively. Similarly, compared with the concretes of Comparative Examples C30-D100, C50-D100, and C70-D100, the water absorptions of the concretes of Examples C30-D100, C50-D100, and C70-D100 after immersion in water decrease from 9%, 6%, and 4% to 5%, 3%, and 2%, respectively. In addition, compared with the concretes of Comparative Examples C30, C50, and C70, the water absorptions of the concretes of Examples C30-D100, C50-D100, and C70-D100 after immersion in water decreased by 41%, 38%, and 27%, respectively. It is seen that the water absorption of the desert sand concrete could be significantly reduced through the compression casting, making the desert sand concrete structure more compact and durable.

Test Example 5

Carbonation of cementitious materials in concrete could increase steel corrosion and reduce the durability of concrete structures. Excessive carbon dioxide infiltration into the concrete pore structure could attack calcium silicate hydrates, create cracks and large pores, and affect porosity, strength, and chemical composition, leading to cracking, shrinkage, and durability issues.

Figure 9:
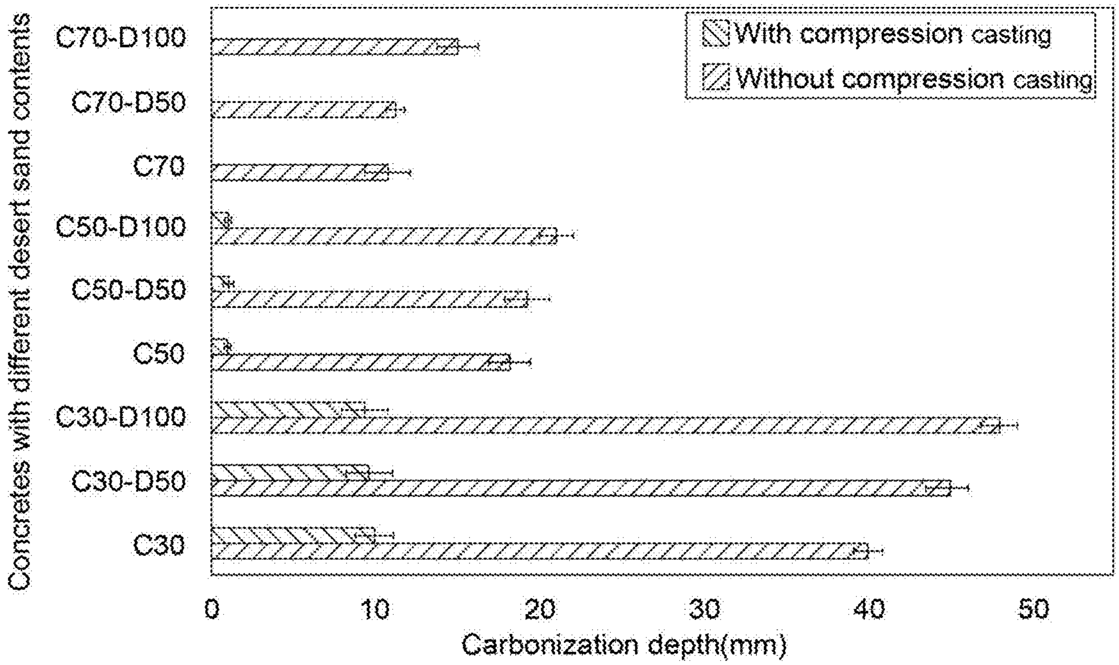
FIG. 9 shows carbonization depths of the concretes in Examples 1 to 9 and Comparative Examples 1 to 9.

The concretes prepared in Examples 1 to 9 and Comparative Examples 1 to 9 were tested for carbonation resistance in accordance with GB/T 50082:2009, and the results are shown in FIG. 9. As shown in FIG. 9, the carbonation depth increased with the increase of the desert sand content: compared with the concretes of Comparative Examples C30, C50, and C70, the carbonation depths of the concretes of Comparative Examples C30-D100, C50-D100, and C70-D100 increased from 40 mm, 18 mm, and 11 mm to 48 mm, 21 mm, and 15 mm, respectively.

Compared with the concretes of Comparative Examples, the carbonation resistance of all the concretes of Examples is significantly improved: compared with the concretes of Comparative Examples C30, C50, and C70, the carbonation depths of the concretes of Examples C30, C50, and C70 are reduced from 40 mm, 18 mm, and 11 mm to 10 mm, 1 mm, and 0 mm, respectively. Similarly, compared with the concretes of Comparative Examples C30-D100, C50-D100, and C70-D100, the carbonation depths of the concretes of Examples C30-D100, C50-D100, and C70-D100 are reduced from 48 mm, 21 mm, and 15 mm to 9 mm, 1 mm, and 0 mm, respectively.

Compared with the concretes of Comparative Examples C30, C50, and C70 concretes, the carbonation resistances of the concretes of Examples C30-D100, C50-D100, and C70-D100 are increased by 77%, 94%, and 100%, respectively. The significant improvement in the carbonation resistance of concrete of Example was due to the reduction of porosity through the compression casting. The reduction of porosity effectively blocks the diffusion path of carbon dioxide from the atmosphere into the concrete, thereby reducing the carbonation depth. It is seen that the carbonation resistance of the desert sand concrete could be significantly improved through the compression casting, thereby effectively reducing the penetration of the carbon dioxide and improving the corrosion resistance of desert sand reinforced concrete structural components.

Test Example 6

Corrosion of reinforced concrete structures due to chloride ion intrusion is a serious deterioration mechanism that depends primarily on the transport capacity of chloride ions.

Figure 10:
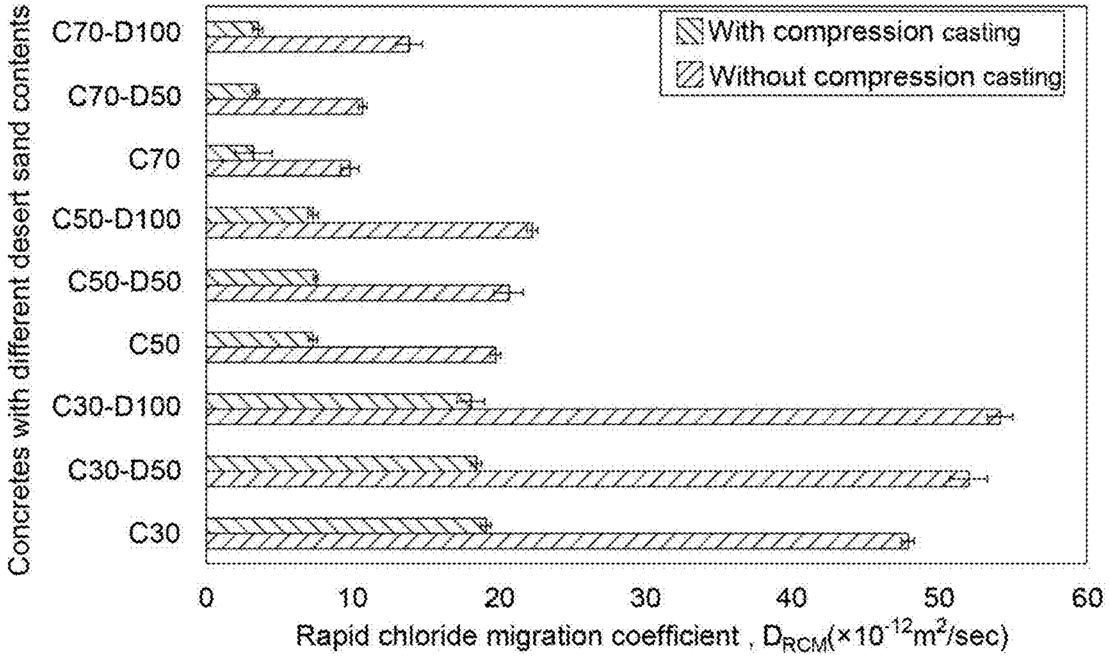
FIG. 10 show chloride migration coefficients of the concrete in Examples 1 to 9 and Comparative Examples 1 to 9.

The concretes prepared in Examples 1 to 9 and Comparative Examples 1 to 9 were tested for chloride ion penetration resistance in accordance with NT-Build 492:2011, and the results are shown in FIG. 10. As shown in FIG. 10, as the desert sand content increases, the concrete's resistance to chloride ion penetration decreases: compared with the concretes of Comparative Examples C30, C50, and C70, the rapid chloride migration coefficient (DRCM) of the concretes of Comparative Examples C30-D100, C50-D100, and C70-D100 increase from $48\times10^{-12}$ $m^2/sec$, $20\times10^{-12}$ $m^2/sec$, and $10\times10^{-12}$ $m^2/sec$ to $54\times10^{-12}$ $m^2/sec$, $22\times10^{-12}$ $m^2/sec$, and $14\times10^{-12}$ $m^2/sec$, respectively.

Compared with the concrete of Comparative Example, the chloride ion resistance of all the concretes of Examples is significantly improved: compared with the concretes of Comparative Examples C30, C50, and C70, the DRCM values of the concretes of Examples C30, C50, and C70 are reduced from $48\times10^{-12}$ $m^2/sec$, $20\times10^{-12}$ $m^2/sec$, and $10\times10^{-12}$ $m^2/sec$ to $19\times10^{-12}$ $m^2/sec$, $7\times10^{-12}$ $m^2/sec$, and $3\times10^{-12}$ $m^2/sec$, respectively. Similarly, compared with the concretes of Comparative Examples C30-D100, C50-D100, and C70-D100, the DRCM values of the concretes of Examples C30-D100, C50-D100, and C70-D100 decrease from $48\times10^{-12}$ $m^2/sec$, $20\times10^{-12}$ $m^2/sec$, and $10\times10^{-12}$ $m^2/sec$ to $18\times10^{-12}$ $m^2/sec$, $7\times10^{-12}$ $m^2/sec$, and $4\times10^{-12}$ $m^2/sec$, respectively. In addition, compared with the concretes of Comparative Examples C30, C50, and C70 concretes, the DRCM values of the concretes of Examples C30-D100, C50-D100, and C70-D100 decrease by 62%, 63%, and 64%, respectively. It is seen that the resistance of the desert sand concrete to chloride ion penetration could be significantly improved through the compression casting, making it a feasible solution to improve the durability of concrete structures.

It can be seen from the above Examples that the high-performance compressed desert sand concrete obtained by the method provided by the present disclosure shows a significant performance improvement effect. The compressive strength, elastic modulus, and splitting tensile strength are increased by 125%, 82%, and 70%, respectively, while the water absorption resistance, chloride ion resistance, and carbonization resistance are also increased by 41%, 64%, and 100%, respectively.

Although the present disclosure is described in detail in conjunction with the foregoing embodiments, they are only a part of, not all of, the embodiments of the present disclosure. Other embodiments can be obtained based on these embodiments without creative efforts, and all of these embodiments shall fall within the scope of the present disclosure.

What is claimed is:

1. A method for preparing a high-performance compressed desert sand concrete, comprising the following steps:

mixing a cement, a coarse aggregate, a fine aggregate, and water, and subjecting a resulting fresh concrete mixture to compression casting, and curing in sequence to obtain the high-performance compressed desert sand concrete; wherein the compression casting comprises filling of a steel mold with the resulting fresh concrete mixture while compression;

the fine aggregate comprises river sand and desert sand at a mass ratio of 0-99:1-100;

the compression casting is conducted at a pressure of not less than 2 MPa for not less than 2 min; and a mass ratio of the cement to the coarse aggregate is in a range of 1:0.5-10.

2. The method of claim 1, wherein the curing is conducted at a temperature of 18° C. to 30° C. under a relative humidity of not less than 60% for 14 days to 28 days.

3. The method of claim 1, wherein the compression is conducted for 24 h.

4. The method of claim 1, wherein a mass ratio of the water to the cement is in a range of 0.1-0.7:1.

5. The method of claim 1, wherein raw materials for the mixing further comprise one or more selected from the group consisting of a metal mesh and a fiber; and the fiber comprises one or more selected from the group consisting of a steel fiber and a synthetic fiber.

6. A method for preparing a high-performance compressed desert sand concrete, comprising the following steps:

mixing a cement, a coarse aggregate, a fine aggregate, and water, and subjecting a resulting fresh concrete mixture to compression casting, and curing in sequence to obtain the high-performance compressed desert sand concrete; wherein the compression casting comprises filling of a steel mold with the resulting fresh concrete mixture while compression;

the fine aggregate comprises river sand and desert sand at a mass ratio of 0-99:1-100;

the compression casting is conducted at a pressure of not less than 2 MPa for not less than 2 min;

raw materials for the mixing further comprise one or more selected from the group consisting of a metal mesh and a fiber;

the fiber comprises one or more selected from the group consisting of a steel fiber and a synthetic fiber; and a total volume of the metal mesh and the fiber accounts for not more than 2% of the high-performance compressed desert sand concrete.

7. The method of claim 1, wherein the high-performance compressed desert sand concrete is used to manufacture desert sand brick, a desert sand block, a desert sand prefabricated pipe, a desert sand prefabricated building beam, a desert sand prefabricated building wall, and a desert sand prefabricated building panel.

* * * * *